Sept. 16, 1958 — E. J. SKIPP — 2,852,306
MOBILE CAR WASHER
Filed Aug. 17, 1956
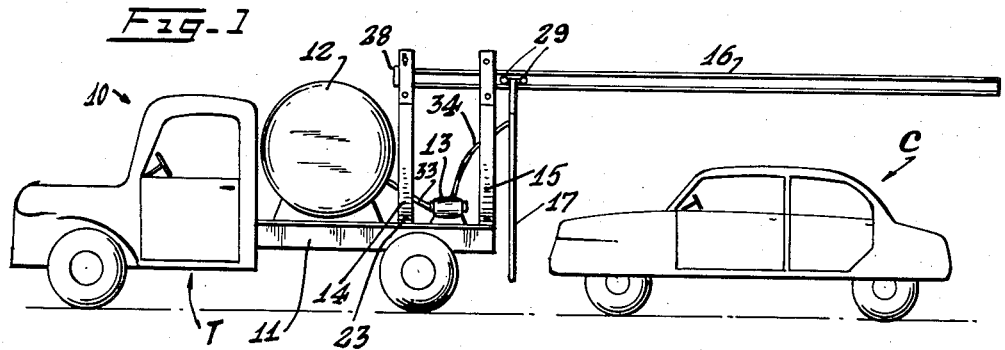
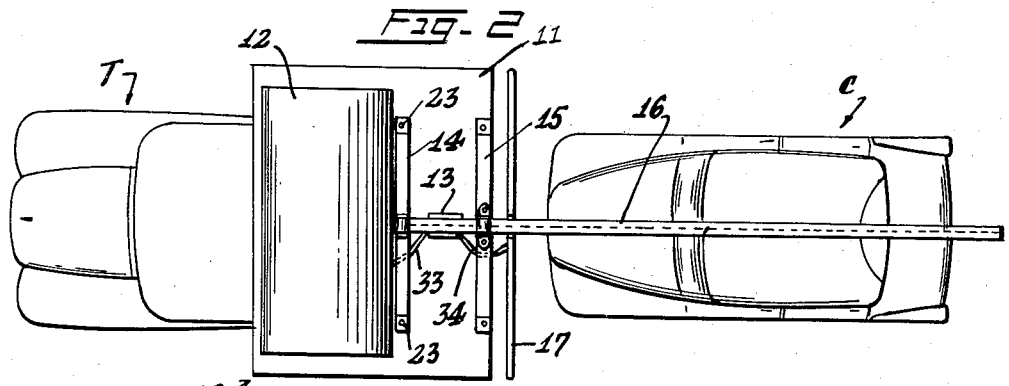
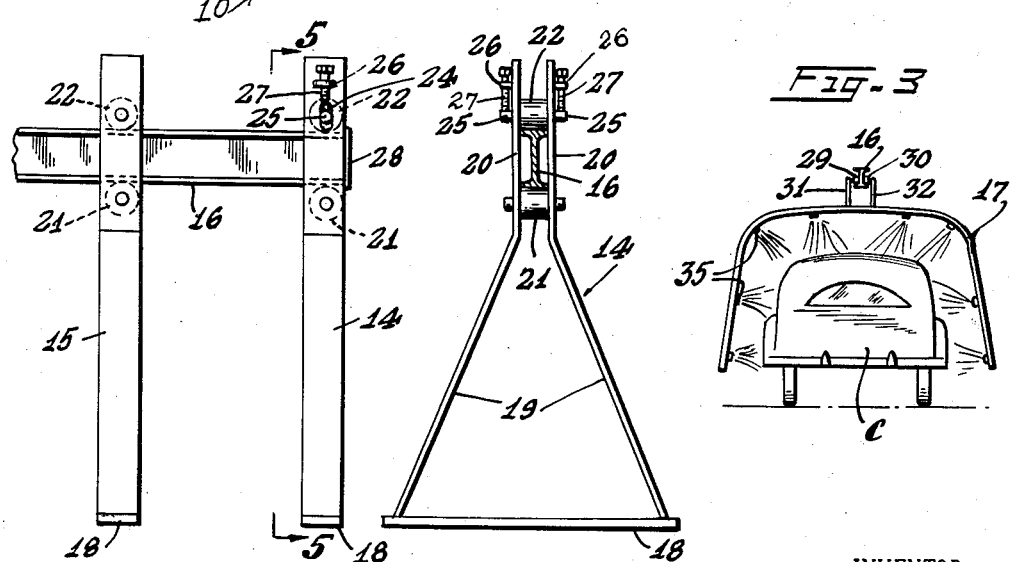
INVENTOR.
EDWARD J. SKIPP
BY
H. G. Manning
ATTORNEY.

United States Patent Office 2,852,306
Patented Sept. 16, 1958

2,852,306
MOBILE CAR WASHER

Edward J. Skipp, Naugatuck, Conn.

Application August 17, 1956, Serial No. 604,720

8 Claims. (Cl. 299—41)

My invention relates to car washing devices and is directed particularly to a mobile washer which can be moved from place to place for washing automotive vehicles wherever they may be parked.

It is the principal object of my invention to provide a mobile car washer of the above nature which is suitable for washing unattended vehicles where they are parked, for example, in factory parking lots, while their owners are busy working.

It is a further object of the invention to provide a mobile car washer of the character described that is easy to construct and use, and efficient and durable in operation.

Other objects, features and structural details of the invention will be apparent from the following description when read in conjunction with the accompanying drawing illustrating a preferred form of my invention, wherein:

Fig. 1 represents a side view of the mobile car washer embodying the invention, shown in position for washing a car;

Fig. 2 is a top view of the car washer shown in Fig. 1;

Fig. 3 is a rear view of a car being washed by the movable water spray pipe embracing the top and sides of said car;

Fig. 4 is a side view of the supporting V-frame for supporting the spray pipe guide rail, constituting part of the invention; and Fig. 5 is a vertical cross-sectional view taken along the line 5—5 of Fig. 4.

Referring now to the drawings, wherein like reference numerals denote corresponding parts throughout the several views, the numeral 10 designates the mobile car washing apparatus in general, which is shown in Figs. 1 and 2 in position for washing a car designated by the letter C. The washing apparatus 10 is supported on a platform 11 carried by a truck T, and comprises a tank 12 containing liquid, such as water, for cleaning the exterior of the car C. The tank 12 preferably has a capacity of 500 gallons or more, and provision is made of a gasoline motor driven pump and generator 13 for pumping water from the tank 12 under pressure. Provision is also made of a pair of spaced triangular support frames 14 and 15 carrying a horizontal I-beam guide rail 16, and a U-shaped spray pipe 17 depending from and slidable along said guide rail 16.

As can best be seen in Fig. 5, each of the support frames 14, 15 comprises a horizontal base member 18, near the ends of which are secured, as by welding, a pair of inwardly inclined side members 19 and vertically-extending upper portions 20. The vertically-extending spaced apart portions 20 of each support frame 14, 15 are provided with circular openings which serve as bearings for a lower pair of cylindrical rollers 21 and an upper pair of cyclindrical rollers 22.

As best seen in Figs. 1 and 2, the support frames 14 and 15 are secured in spaced relation upon the truck platform 11 by means of bolts 23.

The guide rail 16 is carried between the upper and lower cylindrical roller pairs 21 and 22, and is movable from the position shown in the drawings, inwardly over the truck body when the device is not in use.

In order to clamp the guide rail 16 in one position or the other, the upper roller 22 in the support frame 14 is journalled in elongated openings 24 through which the shaft ends 25 of said roller project. The vertically-extending upper portions 20 of the support frame 14 are each further provided with a vertically drilled and threaded lug 26, which is fitted with a screw bolt 27 positioned above each of the shaft ends 25. The screw bolts 27 are thus operative as set screws to push the roller 22 downwardly in its elongated journalling opening 24 to clamp against the top of the rail 16 when said screw bolts 27 are tightened. In this manner, the rail 16 may be held fixed in the support frames 14, 15 and with respect to the truck T at any desired longitudinal position. The rail 16 is preferably provided with a forward end plate 28 which serves to limit the outward movement of said rail to its maximum amount.

The spray pipe 17 is U-shaped and is supported in inverted position from the guide rail 16 by means of a carriage comprising two pairs of rollers 29, 30, one pair being disposed to ride along each side within said I-beam guide rail 16.

A pair of vertical support brackets 31, 32 connect with the spray pipe 17 at one end, and at their other ends journal the respective roller pairs 29, 30. It will thus be apparent that the spray pipe 17 may be moved back and forth, as desired, for washing a car, when the rail 16 is in the extended position as illustrated.

A pipe 33 interconnects the water tank 12 with the input of the pump 13; and a flexible hose 34 interconnects the output of the pump 13 with the spray pipe 17. The flexible hose 34 is long enough, of course, to allow the spray pipe to travel the full length of the guide rail 16 when extended. As shown in Fig. 3, the spray pipe 17 is provided with a plurality of interior water spray heads 35.

Operation

In use, the car C to be washed will be driven behind the truck T of the mobile car washer. The guide rail 16 will then be moved to its extended position, as illustrated in Figs. 1 and 2, and locked by the screw bolts 27. The pump 13 will then be turned on to force water from the tank 12 out of the spray heads 35 of spray pipe 17, as shown in Fig. 3. The spray pipe 13 will then be moved slowly back and forth from one end to the other along the guide rail 16 embracing the car C being washed, to wash and rinse the car as may be necessary. Since an average of about ten gallons of water is required for washing one car, about 50 cars can be washed before it becomes necessary to refill the water tank 12.

If desired, the combination pump and generator 13 may be employed to operate a vacuum cleaner for the interior of the car while being washed.

While I have described herein a preferred embodiment of my invention, it is to be understood that this disclosure is for the purpose of illustration only and that various omissions, or changes in arrangement of parts, as well as the substitution of equivalent elements for those herein shown and described, may be made without departing from the spirit and scope of the invention as set forth in the appended claims.

Having thus fully described the invention, what is claimed as new and for which it is desired to secure Letters Patent is:

1. A mobile car washer comprising an automotive truck, a guide rail horizontally mounted at the upper part of said truck, a spray member slidably mounted on said rail for longitudinal movement thereon, and liquid supply means mounted on said truck operative to supply liquid under pressure to said spray member while it is moved along said rail to wash a car located under said rail at the rear of said truck and means to movably support said rail beyond the rear end of said truck to serve as a cantilever to support said slidable spray member during use.

2. The car washer as defined in claim 1, wherein said spray member comprises a U-shaped pipe disposed in inverted position below said rail.

3. The car washer as defined in claim 2, wherein said rail comprises an I-beam, and wherein said spray member supported means comprises two pairs of rollers, one disposed within each side of said I-beam.

4. The invention as defined in claim 1, wherein said guide rail mounting means comprises a pair of frame members supported in mutually-spaced relation on said vehicle, and upper and lower cylindrical rollers rotatably journalled in vertically spaced relation in each of said frame members, said rail being constrained to horizontal movement between said upper and lower rollers, whereby said rail is movable horizontally with respect to said truck.

5. The invention as defined in claim 4, wherein said frame members are spaced along the direction of travel of said truck, whereby said rail may be moved from a position over said truck to a position extending to the rear of said truck.

6. The invention as defined in claim 5, including means for locking said rail in adjusted position with respect to said frame members.

7. The invention as defined in claim 5, including mechanism for pressing one of said upper cylindrical rollers against said rail for locking said rail in adjusted position with respect to said frame members.

8. The invention as defined in claim 1, wherein said liquid supply means comprises a tank and a pump interconnecting said tank and said spray member, said spray member comprising a U-shaped pipe disposed in inverted position below said rail, and a plurality of spray heads fitted in spaced relation in said pipe and operative to direct liquid inwardly therefrom whereby a car embraced by said spray pipe will be washed from one end to the other as said spray pipe is moved along said rail.

References Cited in the file of this patent

UNITED STATES PATENTS

| | | |
|---|---|---|
| 2,416,352 | Seward | Feb. 25, 1947 |
| 2,588,598 | Willis | Mar. 11, 1952 |
| 2,676,600 | Vani | Apr. 27, 1954 |